United States Patent
Shafaat et al.

(10) Patent No.: US 8,041,504 B2
(45) Date of Patent: Oct. 18, 2011

(54) METHOD AND SYSTEM FOR DISPLAY OF GUIDANCE REFERENCE FOR TRAFFIC SITUATIONAL AWARENESS

(75) Inventors: Syed Taji Shafaat, Everett, WA (US); Jennifer L. Gertley, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 951 days.

(21) Appl. No.: 11/958,216

(22) Filed: Dec. 17, 2007

(65) Prior Publication Data
US 2009/0157287 A1   Jun. 18, 2009

(51) Int. Cl.
G06G 7/76   (2006.01)

(52) U.S. Cl. ......... 701/120; 701/208; 701/300; 340/907

(58) Field of Classification Search ............ 701/3, 4, 701/14, 35, 36, 119, 120, 207, 211, 213, 701/215, 300, 301, 208, 209; 340/901, 903, 340/907, 945; 342/29–51
See application file for complete search history.

(56) References Cited

U.S. PATENT DOCUMENTS

| | | | |
|---|---|---|---|
| 5,248,968 A | 9/1993 | Kelly et al. | |
| 6,118,385 A | 9/2000 | Leard et al. | |
| 6,160,497 A | 12/2000 | Clark | |
| 6,683,562 B2 | 1/2004 | Stayton et al. | |
| 7,015,829 B2 | 3/2006 | Godard et al. | |
| 7,212,918 B2 * | 5/2007 | Werback | 701/120 |
| 7,212,920 B1 | 5/2007 | Bailey et al. | |
| 7,307,578 B2 | 12/2007 | Blaskovich et al. | |
| 7,548,183 B2 * | 6/2009 | King et al. | 342/29 |
| 7,724,178 B2 * | 5/2010 | Brandao et al. | 342/29 |
| 7,739,042 B2 * | 6/2010 | Stiller et al. | 701/211 |
| 7,786,922 B2 * | 8/2010 | Stayton et al. | 342/30 |
| 7,826,971 B2 * | 11/2010 | Fontaine et al. | 701/301 |
| 2005/0156777 A1 | 7/2005 | King et al. | |
| 2006/0227036 A1 | 10/2006 | Blaskovich et al. | |
| 2009/0153343 A1 | 6/2009 | Shafaat et al. | |

FOREIGN PATENT DOCUMENTS

EP   0545473 A2   6/1993

OTHER PUBLICATIONS

European (EP) Search Report for Application No. 08172018.7, dated Jul. 23, 2007, 9 pages.
U.S. Appl. No. 11/600,012, filed Nov. 14, 2006, Goodman et al.

* cited by examiner

Primary Examiner — Richard M. Camby
(74) Attorney, Agent, or Firm — The Boeing Company; Brook Assefa

(57) ABSTRACT

Situational Awareness and Guidance Reference (SAGR) and associated methods and systems are disclosed. A system in accordance to one embodiment of the disclosure includes a display system utilized for a traffic application and an SAGR associated with the own-ship symbol providing longitudinal and lateral guidance reference. In a manual implementation, the SAGR aids human operators achieve required longitudinal and lateral spacing from selected traffic by depicting a small operating region on a navigational map display within which an aircraft will have achieved the required spacing. Such depiction of the deviation guidance may be with respect to time or distance relative to selected traffic aircraft or to fixed structure, and engaged in an automatic or manual mode.

23 Claims, 5 Drawing Sheets

METHOD AND SYSTEM FOR DISPLAY OF GUIDANCE REFERENCE FOR TRAFFIC SITUATIONAL AWARENESS

TECHNICAL FIELD

Aspects of the present disclosure are directed to display of guidance reference for situational awareness of airborne traffic and associated systems and methods.

BACKGROUND

Complex dynamical systems such as air traffic management and control are facing increasing demands from private, commercial, and military operations. Vehicles such as airplanes, ships, and other mobile platforms are able to meet stringent safety, efficiency, and performance requirements through the integration of complex on-board computer systems. Such complex on-board computer systems work not only with other on-board equipment but must communicate with complex systems of other mobile or fixed platforms' computer systems. While such complex systems can be designed to interact with each other in a variety of ways, they must in the end be subject to supervisory review and control by a human operator. Thus, one prime goal of a traffic management and control tool is to help human operators guide their vehicle consistent with the requirements of the given traffic surveillance scenario.

Complex systems utilized for air traffic management, as well as, guidance and control often rely on human-machine interfaces to present information to pilots and operators. One important human-machine interface in traffic management, as well as, guidance and control of vehicles such as aircraft is a display system that depicts information not only about the own-ship's state information but also about the traffic environment including information on nearby traffic aircraft. While display systems have been designed to satisfy guidance and control needs for navigation purposes and traffic information needs for surveillance purposes primarily separately, the increasing complexity of air traffic management and control requirements is driving the need to integrate the situational awareness information with aspects of display systems that present information on guidance and control of an aircraft. However, the increasing amount of available traffic information in relation to the limited display space, as well as, the need for an intuitive guidance representation, often create a contention that poses a serious challenge of providing meaningful context to human operators.

Moreover, as an important human-machine interface, display systems generally have to be shared between multiple applications, often displaying the status information of multiple systems. For example, an aircraft depicted as a traffic symbol may transmit information suitable for navigation, surveillance, and communication purposes. Such information may be utilized, at various stages, partly by the own-ship's navigation system, partly by the surveillance system, and partly by the communication system. The processed information may also be displayed at multiple display interfaces. Thus, human operators such as pilots have the difficult task of integrating the displayed information of multiple systems in a meaningful and efficient way not only to gain situational awareness of the traffic scenario but also to guide their vehicle in a manner consistent with the traffic scenario.

SUMMARY

The present disclosure addresses these challenges by displaying a context-sensitive Situational Awareness Guidance Reference (SAGR) as a guidance cue suitable to the traffic situational awareness need at hand. In one embodiment, the SAGR aids human operators achieve required longitudinal and lateral spacing from selected traffic by depicting a small operating region on a navigational map display within which the airplane has achieved the required spacing.

A preferred system for displaying an aircraft's longitudinal and lateral spacing guidance comprises a surveillance system; a traffic application operatively connected to the surveillance system; a cockpit display system operatively connected to the traffic application; a flight control input device operatively connected to the aircraft flight control system; and a navigation system operatively connected to the traffic application. A first input control input device is operatively connected to the traffic application, and a second control input device is operatively connected to the flight control system. A graphical symbol is displayed on the cockpit display system, wherein the graphical symbol comprises a guidance cue proximate to an own-ship symbol. The location of the guidance cue is based on an own-ship's longitudinal and lateral position relative to position of one or more target aircraft, the target aircraft determined from selected traffic information.

In accordance with an aspect of this disclosure, the SAGR is displayed proximate to an own-ship symbol, depicting the location of the own-ship relative to a required path or lane.

In accordance with another aspect of this disclosure, the SAGR is displayed proximate to the own-ship symbol, depicting the location of the own-ship relative to the required maintenance of longitudinal spacing with other traffic of interest.

In accordance with yet another aspect of this disclosure, the SAGR is displayed proximate to the own-ship symbol, depicting the location of the own-ship relative to the required maintenance of lateral spacing with other traffic of interest.

DETAILED DESCRIPTION

Complex dynamical systems such as air traffic management and control are facing increasing demands from private, commercial and military operations. Vehicles such as airplanes, ships, and other mobile platforms have addressed such demands that include stringent safety, efficiency, and performance requirements through the integration of complex on-board systems. For example, navigation and surveillance on-board equipment has evolved from simple equipment such as compasses, automatic direction finders, and Mode A/C transponders to more advanced equipment using capabilities such as Global Positioning Systems (GPS) and Automatic Dependent Surveillance-Broadcast (ADS-B). Guidance and control indicators have also evolved from older federated electromechanical attitude indicators and horizontal situation indicators to more integrated electronic primary flight displays that display, for example, not only the attitude indicator but additional information helpful for guiding the aircraft such as aircraft pitch limit indicators, flight path vector indicators, and collision avoidance indicators.

Such complex on-board systems not only work with other on-board equipment but also communicate with complex systems of other mobile or fixed-platform computer systems. For example, GPS-based on-board navigation equipment is enabled by GPS satellites, and potentially, also by ground-based augmentation systems. ADS-B based surveillance equipment is also enabled by a number of systems including GPS, Inertial Navigation Systems (INS), surveillance systems such as Mode Select (Mode S), Universal Access Transceiver (UAT), and VHF Datalink Mode 4 (VDL-4), and potentially, communications systems such as VHF Datalink, HF Datalink, or other datalink systems.

As datalink capabilities of aircraft increase, the amount of surveillance information and communication information that can be made available to the flight crew also increase. In contrast to past air traffic controller and flight crew radio (voice) communications such as VHF voice and HF voice communications, for example, Controller Pilot Data Link Communications (CPDLC) is now also used to transmit communication data between air traffic controllers and pilots. Such data is automatically loaded into airplane systems such as the Flight Management Computer (FMC) for further acceptance, processing, and providing textual information to the pilot for achieving tasks such as maintaining required spacing. Thus, there is a need to integrate this additional information in a useful way such that a human operator can utilize it to guide his or her own vehicle.

Figure 1:
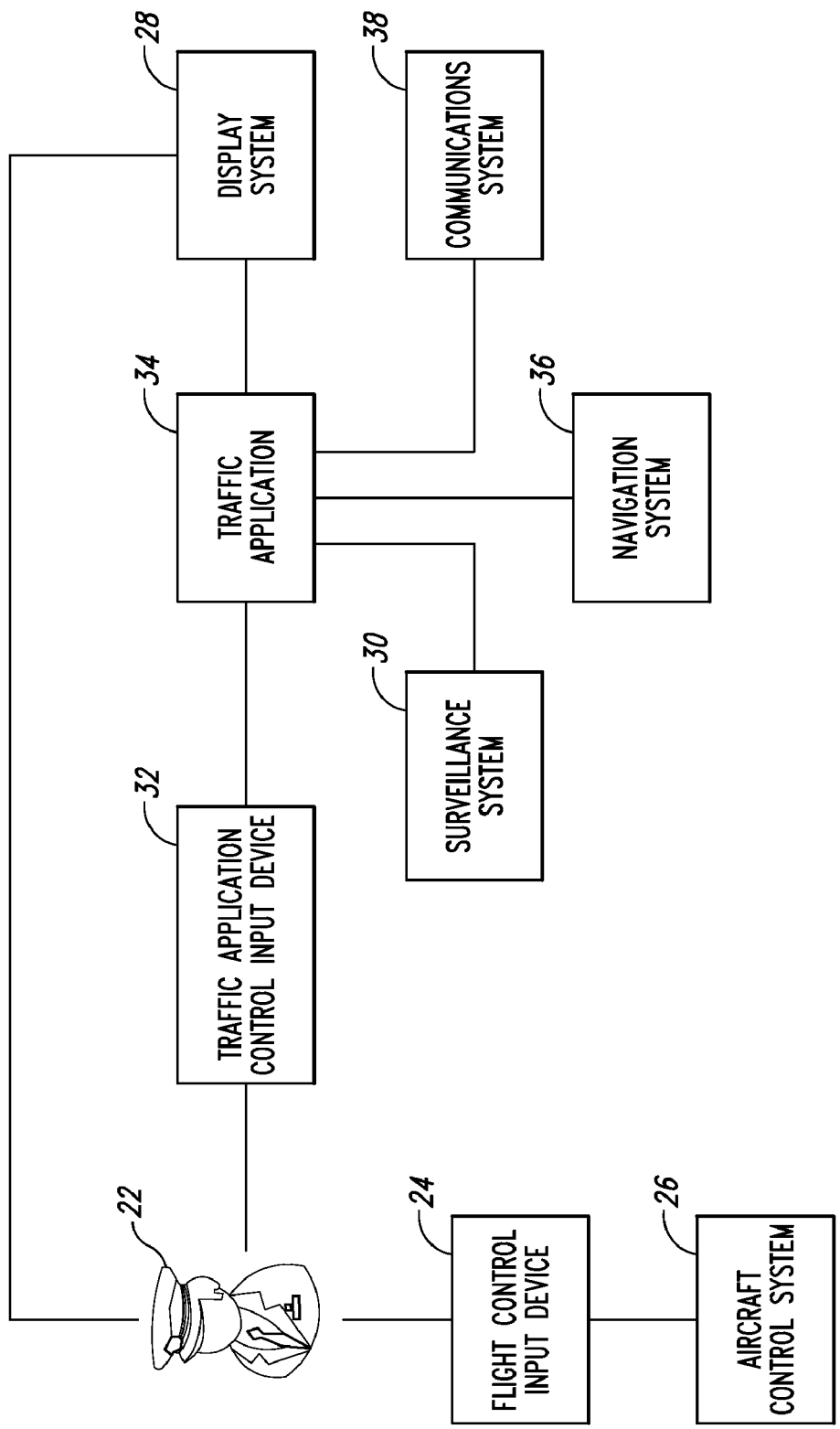
FIG. 1 is schematic diagram of an advantageous embodiment of the systems components according to the disclosure.
Figure 5:
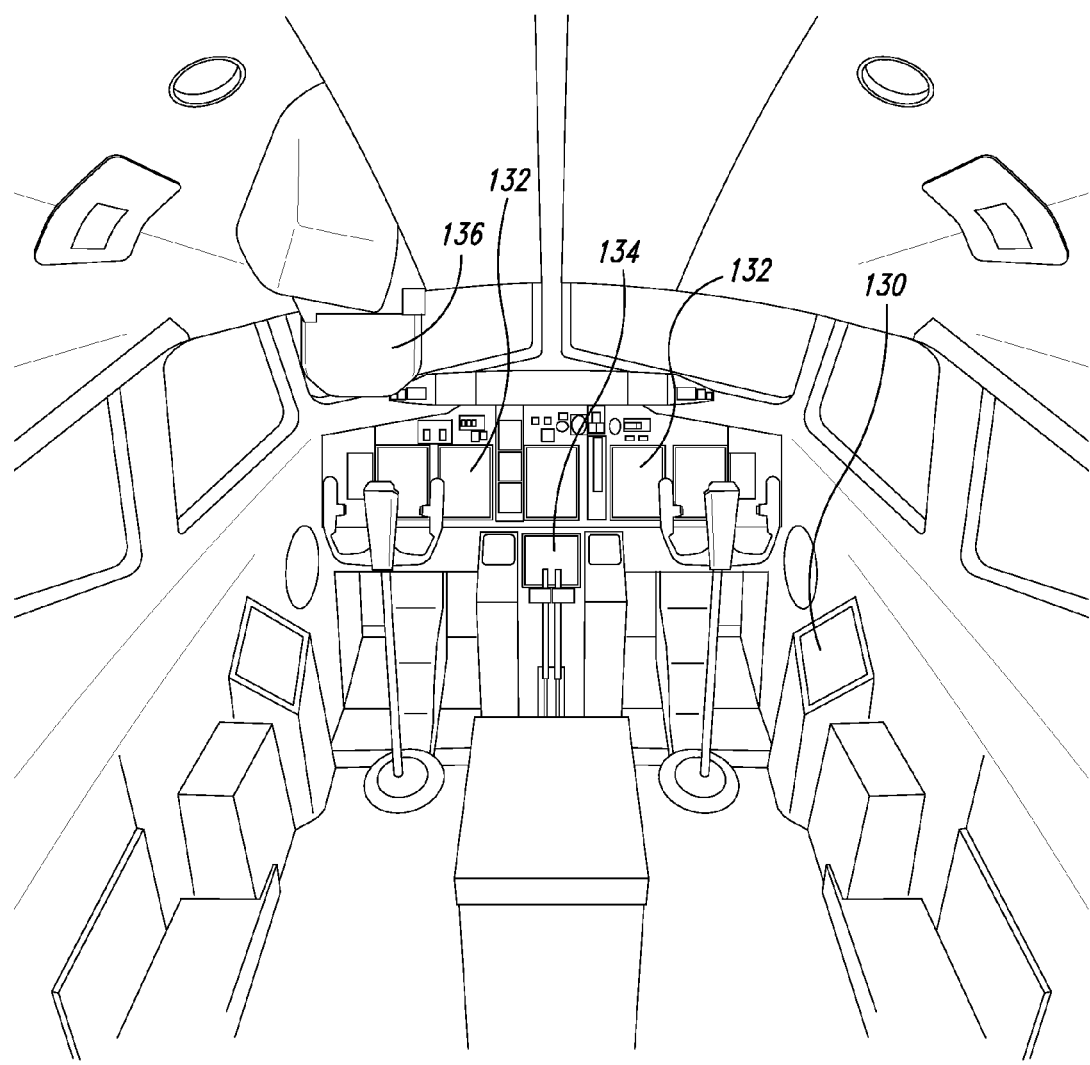
FIG. 5 represents several possible display locations for an advantageous embodiment of the disclosure.

FIG. 1 depicts an embodiment of such complex on-board systems from the vantage point of an on-board system for traffic surveillance system. FIG. 1 has been simplified in order to make it easier to understand the present disclosure. Those skilled in the art will appreciate that FIG. 1 is one configuration of many that can be implemented for an embodiment of an on-board traffic surveillance system. For example, a traffic application 34 can be hosted on a number of on-board computers suitable for the airplane configuration at hand such as a dedicated traffic application computer (not shown), a surveillance system 30, or a display system 28, which typically comprises at least a graphics display computer and a graphics display. In various embodiments, as shown in FIG. 5, the display system may include at least one of a Navigation Display (ND) 132, a Heads-Up Display (HUD) 136, an Electronic Flight Bag (EFB) display 130, and a Multi-Function Display (MFD) 134 or other displays in the flight deck.

Referring to FIG. 1, a surveillance system 30 is provided to receive traffic information of other aircraft and vehicles and to transmit traffic information of own aircraft. Such traffic information may include data such as aircraft identification, aircraft position, speed, and planned trajectory that may be displayed as a function of the traffic application 34 engaged by the crew. An aircraft may have multiple traffic applications such as Traffic Alert and Collision Avoidance System (TCAS), Sequencing an Merging (S&M), and Final Approach and Runway Occupancy Awareness (FAROA). Further, control devices 32 such as control panels, keyboards, cursor control devices, line select keys (LSK) or other keys on a control display unit (CDU), or touch-screen devices may also be provided to control and configure the traffic application 34 that processes the traffic data received from the surveillance system 30. Control devices 32 may also be used to select traffic on the display system 28 for further processing or action.

In addition, the traffic application 34 obtains own-ship navigation information from an aircraft's navigation system 36 or related systems such as the flight management computer (not shown). Navigation information may include data such as own-ship position, speed, or planned trajectory. Navigation information may be used by the traffic application 34 for a number of functions including further processing of traffic information coming from other aircraft, transmitting own-ship information to other aircraft, or presenting information to a human operator 22 on a display system 28 for situational awareness or crew action.

Lastly, the traffic application 34 may be operable to obtain communication information from an aircraft's datalink-based communications system 38 such as those enabled by VHF Datalink, HF Datalink, or other datalink systems such as those enabled by Wi-Fi or WiMAX. Datalink communications may include communication data from other traffic aircraft that augment the traffic information that is received by the surveillance system 30. For example, the datalink communication may include pilot requests for certain crew communication such as confirmation of aircraft identification and request for information such as trajectory planning information or weather information that may be more suitable for the communications system 38 than the surveillance system 30. The traffic application will correlate the traffic information coming from the surveillance system 30 and the communication information coming from the communications system 38 and present the correlated information in a suitable format on the display system 28. Such correlation may also be aided by the crew via control devices 32 or other components of the communication system 38.

While the components of complex systems such as those depicted in FIG. 1 can be designed to interact with each other in a variety of ways, they must in the end be subject to supervisory control by a human operator 22 such as a pilot. Such supervisory control may be achieved by the human operator 22 who integrates the information of the various systems and utilizes flight control input devices 24 such as a control column and a mode control panel (MCP) via manual or autopilot-assisted means to manage aircraft control systems 26 that guide and control the aircraft. The human operator's actions and some of the resultant change in the aircraft's state such as changes in speed, attitude, and altitude may be transmitted via other aircraft subsystems such as an Air Data and Inertial Reference Unit (ADIRU) (not shown) to the display system for visual feedback.

Key to considering potential control actions or guiding an aircraft in the context of complex air traffic management scenarios is the human operator's 22 situational awareness of the relevant nearby traffic. One important human-machine interface in traffic management is a display system 28 that depicts information not only about the own-ship state but also about the traffic environment including information on nearby traffic aircraft. But because the display system 28 may also display information coming from a variety of systems such as the navigation system 36 and the communication system 38, the amount of information relative to the limited display space often creates a contention that poses a serious challenge of providing meaningful context to human operators.

Figure 2:
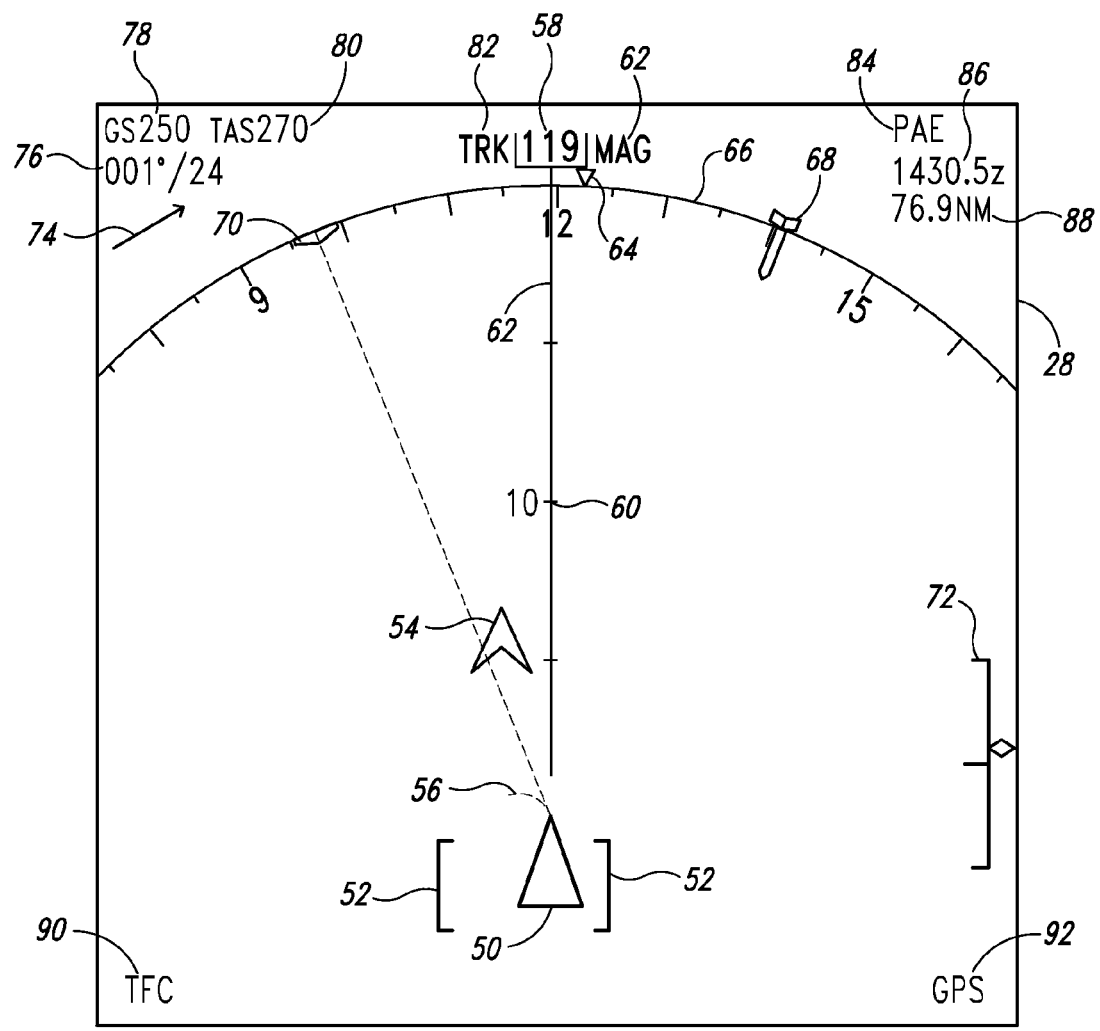
FIG. 2 is a diagram illustrating a graphics display used for navigation and surveillance.

FIG. 2 depicts one mode of a display system 28 used for navigation, surveillance, and guidance purposes. Those skilled in the art will appreciate that FIG. 2 depicts one configuration of many that can be implemented for an embodiment of a shared display system. The display system indicates that the navigation source is GPS 92. The TFC designation 90 also shows a traffic application is selected to be displayed.

Referring to FIG. 2, those skilled in the art may recognize that current mode of the display system is primarily navigational. Although not shown, the display system can be engaged to display weather systems, terrain, or other data. In the current map mode, the display system 28 shows an expanded compass rose 66, range scale 60, a current heading pointer 64, an own-ship symbol 50, ground speed 78, true airspeed 80, current track 58, track-up indication 82, and magnetic reference 62. Furthermore, the display shows a position trend vector 56, a VOR pointer 68, selected heading indicator 70, VNAV path pointer and deviation scale 72, wind arrow 74, wind direction and speed 76, active waypoint 84, estimated time to active waypoint 86, and current distance to active waypoint 88. Lastly, still referring to FIG. 2, the surveillance information presented include a lead airplane 54, shown ahead of the own-ship symbol. A Situational Awareness Guidance Reference (SAGR) 52 is shown in a preferred embodiment bracketing the own-ship symbol.

The traffic configuration shown in FIG. 2 has only one traffic symbol depicting a lead airplane 54 and with a 20 mile display range. However, in modern aircraft the display range can vary from very low to very large distances such as from 0.25 nautical miles to more than 1000 nautical miles. Furthermore, there could be several traffic symbols depicting traffic aircraft. Thus, when the display system 28 is shared between navigation and surveillance applications, the presentation of the traffic aircraft and the available situational awareness tools by which human operators can guide their aircraft in relation to other traffic aircraft presents a technical challenge.

Consequently, for certain traffic applications that require better display accuracy of the traffic aircraft than can be afforded by the selected display range for navigation purposes or by other limitations of the display system, human operators 22 such as pilots are faced with a difficult task of ascertaining the location of traffic aircraft to the desired accuracy such that they can guide and control their aircraft in relation the desired traffic aircraft such as a lead airplane 54. Thus, there is a need to aid human operators 22 who have the difficult task of integrating the displayed information of multiple systems such as those shown in FIG. 2 in a meaningful and efficient way to gain situational awareness of the traffic scenario and to guide their aircraft in relation to the depicted traffic scenario.

The present disclosure addresses this challenge in a meaningful way by displaying a Situational Awareness Guidance Reference (SAGR) 52 suitable to the traffic situational awareness and guidance need at hand. The SAGR 52, displayed on or proximate to the own-ship symbol 50, indicates to the pilot how to guide the aircraft relative to another aircraft such as a lead airplane 54, such that the own-ship symbol is preferably centered within the SAGR.

Figure 3:
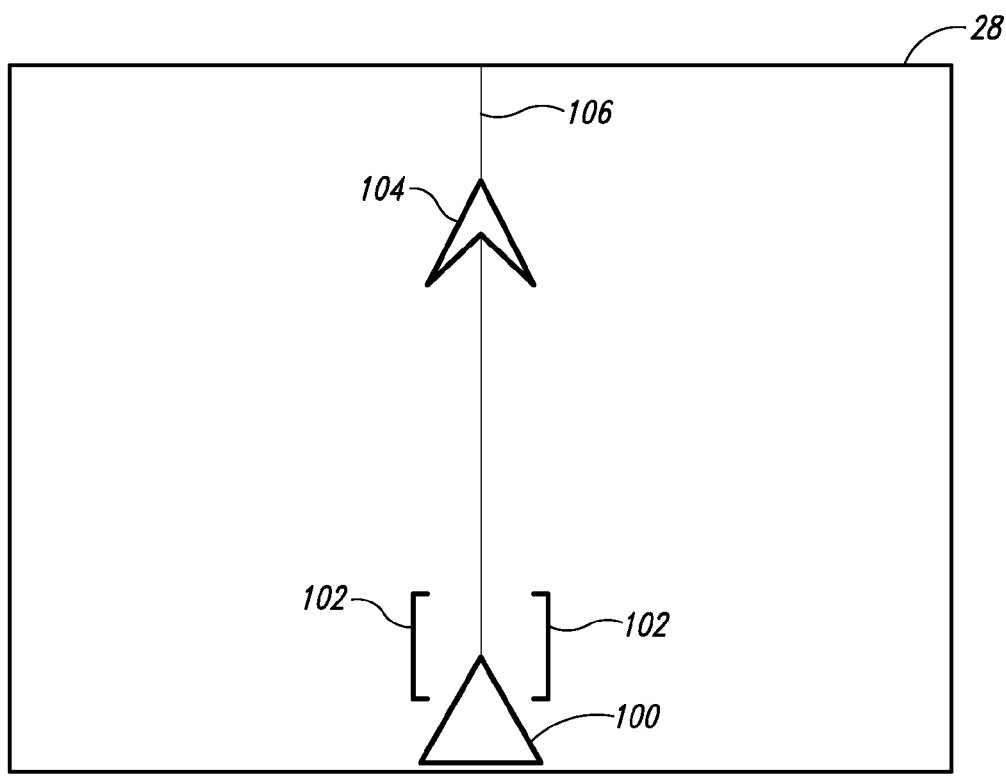
FIG. 3 is a diagram illustrating the use of the SAGR in a longitudinal spacing conditions.

FIG. 3 provides an example of how an SAGR 102 is used. As depicted in FIG. 3, an own-ship symbol 100 in relation to the SAGR 102 is slightly behind the SAGR 102 in the longitudinal direction along its own track 106. This indicates to the pilot that the own-ship is slightly behind in the longitudinal direction than where it should be in relation to the traffic of interest, which in this case, is the lead airplane 104. The pilot can manually engage the necessary controls to bring his airplane to increase speed such that the own-ship symbol is centered within the SAGR.

The SAGR 52, 102 can be utilized in several different traffic application implementations. Although longitudinal and lateral deviation may typically be in terms of distance, it could be calculated in terms of time as well. In one aspect of the disclosure, the SAGR 52, 102 can be displayed to guide the human operator to achieve certain time objectives. For example, the human operator may have a requirement to be at the location of the lead airplane 54, 104 in a certain amount of time. In this regard, the SAGR can be displayed to reflect position of own-ship such that it reaches the lead airplane's current position by the required time. Thus, all the human operator need do is place the own-ship symbol at the center of the SAGR. The human operator can engage the necessary control input so as to achieve the objective.

In another aspect of the disclosure, the SAGR 52, 102 may be displayed to guide the human operator to achieve a certain spacing distance for maintaining certain spacing from other aircraft. For example, the human operator may have a requirement to be behind the lead airplane 54, 104 by a certain amount of longitudinal distance. In this regard, the SAGR can be displayed to reflect position of own-ship relative to the required spatial position for the spacing required by the application. The human operator can then engage the necessary control input so as to achieve the objective.

In a similar manner, if the objective is to maintain a certain lateral distance next to the traffic aircraft of interest, the SAGR 52, 102 can be displayed such that control input consistent with the SAGR guidance will achieve the maintenance of the required lateral distance.

In yet a further aspect of the disclosure, the SAGR 52, 102 can be displayed to provide guidance for both longitudinal and lateral spacing. For example, during a parallel approach operation to parallel runways, it may be necessary for the airplane to be a certain longitudinal distance from the lead airplane 54. In this regard, the SAGR not only provides longitudinal spacing but also helps the pilot stay in the assigned lane for the particular runway. The SAGR can be enhanced to provide alerting if the pilot strays from the lane or violates spacing by change of color or some other cautionary or warning indication to alert the pilot. In this case, the SAGR 52, 102 can be displayed such that control input consistent with the SAGR guidance will achieve the maintenance of the required longitudinal and lateral spacing.

Figure 4:
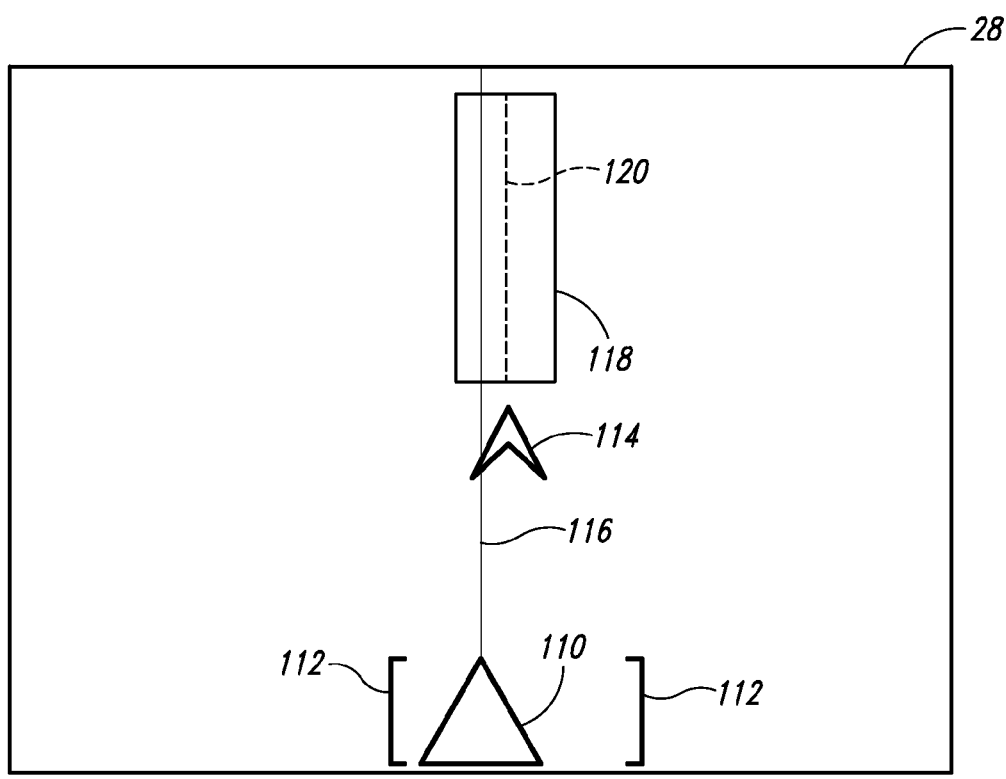
FIG. 4 is a diagram illustrating the use of the SAGR in a lateral spacing condition.

FIG. 4 depicts a simplified version of one example of an SAGR use in relation to final approach. FIG. 4 depicts an own-ship symbol 110, a track line 116, a lead airplane 114, a runway 118, and a runway centerline 120. As can be seen in relation to the track line 116, the own-ship symbol 110 is slightly to the left of the lead airplane 114, as well as, the runway centerline 120. The SAGR 112 shows the own-ship symbol slightly to the left. The pilot may reference the SAGR 112 to steer the airplane slightly to the right such that the own-ship symbol is centered within the SAGR 112.

Thus, the SAGR 52, 102, 112 can aid the human operator 22 in acquiring improved situational awareness beyond what is provided by the traffic symbols such as lead airplane's 54, 104, 114 and regardless of the range setting of the map display. Once the targeted traffic airplane is selected using a control device 32, the human operator can achieve the desired situational awareness and guidance objectives by flying the airplane consistent with indications by the SAGR 52, 102, 112.

Another important aspect of the disclosure is the ability to apply the disclosure in a context-sensitive manner. The sensitivity, which can be in terms of time, distance, or other parameter of interest, can depend on factors such as phase of flight or any critical task for which the flight crew needs improved situational awareness and guidance. Accordingly, the sensitivity may be set by a control device 32 or by systems automation. For example, the SAGR may function to provide longitudinal and lateral deviation with respect to descending aircraft on final approach but may disengage once the lead aircraft has touched down, has executed a missed approach, or when the lead airplane is no longer a factor.

Figure 6:
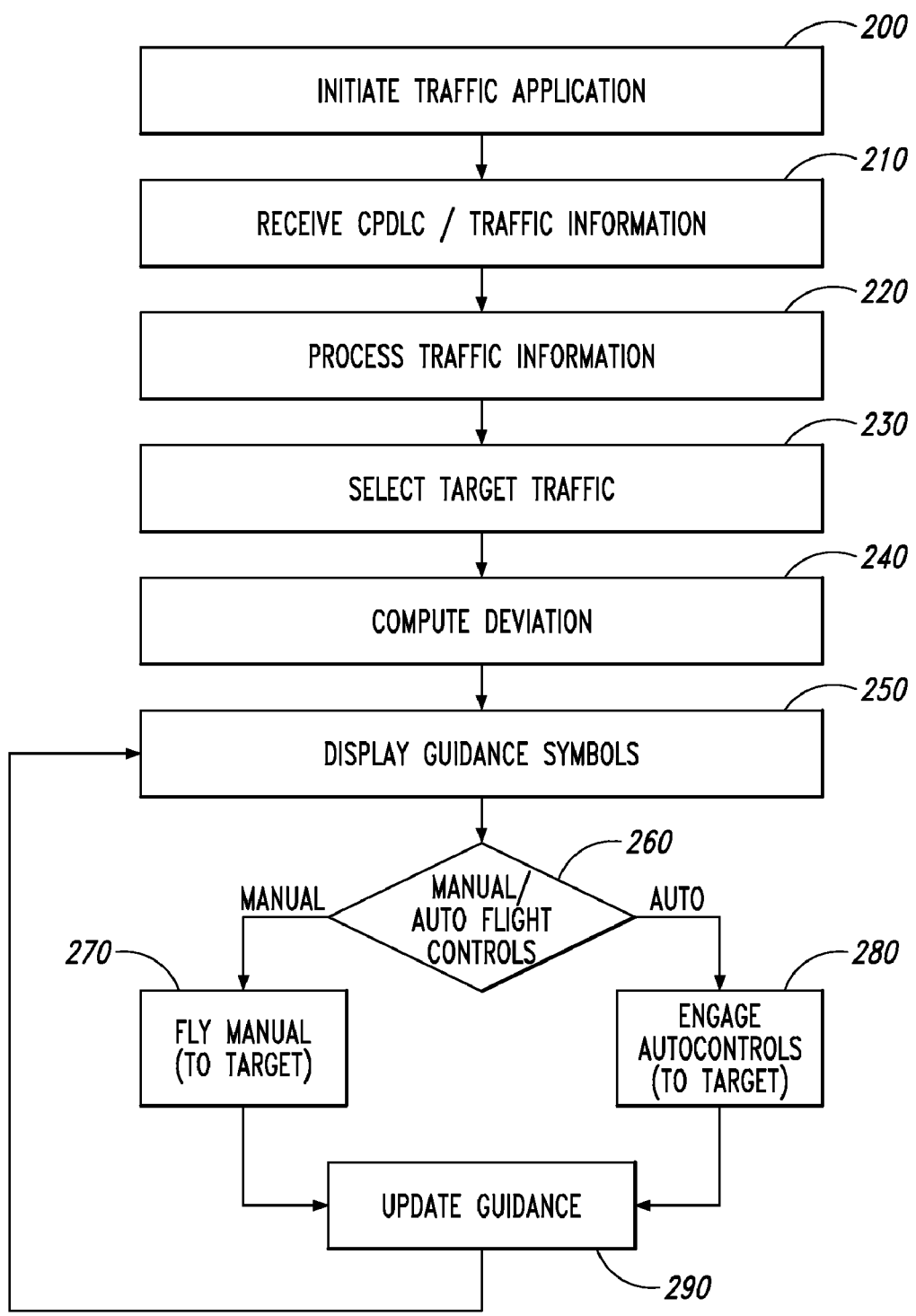
FIG. 6 is a flow chart illustrating an exemplary method for displaying SAGR symbology.

FIG. 6 depicts a general method by which the disclosure may be implemented. The display of traffic symbology and guidance on display systems such as those utilized by Traffic Alert and Collision Avoidance Systems (TCAS) have been previously implemented in industry. Those skilled in the art would understand how the placement of display symbology would be accomplished, and that the depiction herein is one of several possible methods of displaying traffic symbology. First, a human operator 22 initiates a traffic application 200. Alternatively, an on-board computer may automatically initiate the traffic application 200 as a function of phase of flight. This initiation step may range from simply turning on the system, choosing one traffic application from a plurality of available traffic applications, or in the case of initiating different modes of a previously selected application, selecting traffic symbols via a control device 32, or providing the application additional information from another system such as the navigation system 36 or the communication system 38.

Next, the traffic application receives traffic information 210 of other aircraft via the surveillance system 30, and optionally, the communication system 38. Furthermore, the traffic application 34 receives or gets updates of navigation data from the navigation system to determine own-ship position and process traffic information for selection and display 220. After receiving the traffic information of other aircraft and position updates of own-ship, the traffic application 34 processes the traffic data for display and displays the traffic symbols such as the lead airplane 54.

Following the display of the traffic symbols, a traffic symbol of interest is selected 230 such as via a control device 32. The human operator may determine which traffic symbol to select via simple visual acquisition from the display or may utilize information communicated via the communication system such as a CPDLC (Controller Pilot Data Link Communication) message, radio communication from air traffic control, or any other relevant information.

Once the traffic of interest such as a lead airplane 54 is selected, the traffic application computes the relevant parameter of interest 240 such as longitudinal and lateral distance deviation from the selected traffic. The deviation is then used to display the SAGR symbol 250 relative to the own-ship symbol and the selected traffic. The SAGR symbol may be represented as a pair of brackets, a rectangle, or another displayed graphical or textual indicator known to those skilled in the art.

Once the SAGR is displayed, its utilization by the flight crew to guide their airplane relative to the selected traffic depends on whether manual or autoflight controls are engaged 260. If the human operator is flying the airplane manually 270, they can engage a number of control inputs such as throttle levers and control wheels, for example, to speed up or slow down the airplane and steer the airplane respectively consistent with the SAGR. Alternatively, if the human operator has engaged autopilot functions 280, the autothrottle or functions of the mode control panel may engage to speed up, slow down, or steer the airplane so as to cause the own-ship symbol to comply with the guidance of the SAGR. Alternatively, control input may be uplinked to the flight crew from Air Traffic Control. Lastly, the traffic application updates 290 the SAGR as a function of the control input and associated change in the airplane state such as position or speed relative to the selected traffic.

It is important to note that the display of the SAGR, depending on the engaged traffic application, the phase of flight, or other engaged automation functions, can be made to be context-sensitive. For example, if the SAGR is being used on phase of flight such as a final approach to follow the lead airplane at a certain distance, the SAGR can be caused to be removed or change colors when the lead airplane lands and the longitudinal distance or time spacing is no longer relevant. A similar context-sensitive embodiment may be used for parallel runway approaches.

While preferred embodiments have been described above and depicted in the drawings, other depictions of traffic symbols and SAGRs can be utilized in various embodiments of the disclosure. The color and geometric shape of traffic symbol and the SAGR can be varied without departing from the scope of the disclosure as defined by the appended claims. Furthermore, various displays, surveillance systems, navigation systems, and communication systems may be engaged to provide the necessary input for the traffic application in use.

In other embodiments of the disclosure, the SAGR and display of traffic and navigation information, for example, may be simulated in a training simulator or in a desktop application as desired.

In summary, the disclosure addresses the operational challenge of providing context-sensitive situational awareness and associated guidance by displaying a Situational Awareness Guidance Reference (SAGR) suitable to the traffic situational awareness need at hand. The SAGR aids human operators achieve required longitudinal and lateral spacing from selected traffic by depicting a small operating region on a navigational map display within which the airplane is guaranteed to have achieved the required spacing. Such depiction may be in time or distance relative to own-ship or to fixed structure, and engaged in an automatic or manual mode.

We claim:

1. A system for displaying a graphical symbol indicating an own-ship vehicle's desired position relative to at least one other traffic vehicle comprising:
a guidance cue displayed proximate to an own-ship symbol on a navigation map display wherein a location of the guidance cue is based on the own-ship's longitudinal and lateral position relative to a position of the at least one other traffic vehicle displayed on the navigation map display.

2. A system for displaying an own-ship aircraft's longitudinal and lateral spacing guidance relative to at least one other target aircraft, comprising:
a surveillance system;
a traffic application operatively connected to said surveillance system, said traffic application providing traffic information;
a cockpit display system operatively connected to said traffic application;
a navigation system operatively connected to said traffic application;
a first control input device operatively connected to said traffic application;
a second control input device operatively connected to a flight control system; and
a graphical symbol displayed on said cockpit display system, wherein said graphical symbol comprises a guidance cue located proximate to an own-ship symbol on a navigation map display, the location of the guidance cue based on the own-ship's longitudinal and lateral position relative to a position of the at least one other target aircraft displayed on the navigation map display, said target aircraft position determined from traffic information provided by said traffic application.

3. The system of claim 2 wherein said selected traffic information includes airborne vehicle traffic data.

4. The system of claim 2 wherein said selected traffic information includes on-ground vehicle traffic data.

5. The system of claim 2 wherein said selected traffic information includes both airborne vehicle and on-ground vehicle traffic data.

6. The system of claim 2 wherein said guidance cue comprises a pair of square brackets, said square brackets further including color-coded indications depicting guidance.

7. The system of claim 2 wherein said cockpit display system is at least one of a Navigation Display (ND), a Heads-Up Display (HUD), an Electronic Flight Bag (EFB) display, and a Multi-Function Display (MFD).

8. The system of claim 2 wherein said first control input device is at least one of a control panel, a keyboard, a cursor with a cursor control device, line select keys (LSK) on a control display unit, and a touchscreen.

9. The system of claim 2 wherein said navigation system comprises a GPS unit.

10. The system of claim 1 further comprising an electronic map display.

11. A method for providing an aircraft guidance tool for a traffic application on an own-ship aircraft's cockpit display system, comprising:
 initiating a traffic application;
 receiving traffic information from other traffic aircraft;
 processing said traffic information;
 selecting at least one target aircraft from said other traffic aircraft;
 determining longitudinal and lateral deviation of own-ship position relative to said at least one target aircraft displayed on a navigation map display;
 displaying at least one navigation map display guidance cue indicating needed control input to achieve a desired longitudinal and lateral spacing between own-ship aircraft and the at least one target aircraft;
 processing control input according to said at least one navigation map display guidance cue; and
 updating said at least one navigation map display guidance cue based on said processed control input.

12. The method of claim 11 wherein said traffic information comprises at least one of TCAS, Mode A/C, Mode S, ADS-B, UAT, VDL, Wi-Fi, and WiMAX data.

13. The method of claim 11 wherein processing control input is performed manually or automatically when autopilot is engaged, and said needed control input is used to determine said control input for processing.

14. The method of claim 11 wherein processing said traffic information comprises a surveillance system containing a traffic application software program and operatively connected to the cockpit display system.

15. The method of claim 11 wherein processing said traffic information comprises said cockpit display system containing a traffic application software program.

16. The method of claim 11 wherein processing said traffic information further comprises transforming said received traffic information for display for a plurality of traffic applications.

17. The method of claim 16 further comprising augmenting said guidance cue with guidance parameter data, wherein said guidance parameter data includes time spacing and distance spacing.

18. The method of claim 11 wherein said traffic application is initiated by an on-board computer as a function of phase of flight.

19. The method of claim 11 wherein initiating said traffic application comprises initiating a different mode of a previously selected application and selecting target traffic via a control device.

20. The method of claim 11 wherein said control input is uplinked to a flight crew.

21. The method of claim 11 wherein displaying said at least one guidance cue is simulated on a flight simulator.

22. The method of claim 11 wherein displaying said at least one guidance cue is simulated on a desktop computer.

23. A method of indicating a desired positioning of an own-ship vehicle relative to at least one other traffic vehicle on a display comprising:
 displaying an own-ship position on a navigation map display, said own-ship position represented by a first vehicle symbol;
 displaying at least one traffic vehicle position on said navigation map display, represented by at least one second vehicle symbol;
 determining a desired own-ship position relative to said at least one traffic vehicle position; and
 displaying a guidance cue on said navigation map display, wherein said guidance cue indicates where said first vehicle symbol should be located to achieve said desired own-ship vehicle position relative to said at least one traffic vehicle position.

* * * * *